(12) United States Patent
Wanic et al.

(10) Patent No.: US 6,590,034 B2
(45) Date of Patent: Jul. 8, 2003

(54) PEELABLE SEAL AND METHOD OF MAKING AND USING SAME

(75) Inventors: Jeffrey A. Wanic, Lake Jackson, TX (US); Shaun E. Pirtle, Brazoria, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/024,426

(22) Filed: Dec. 18, 2001

(65) Prior Publication Data

US 2002/0150781 A1 Oct. 17, 2002

Related U.S. Application Data

(60) Provisional application No. 60/259,365, filed on Jan. 2, 2001.

(51) Int. Cl.[7] .......................... C08L 23/00; C08L 23/04; C08L 33/14; B32B 27/00; B32B 27/08
(52) U.S. Cl. ....................... 525/191; 525/199; 525/207; 525/213; 525/222; 525/224; 525/240; 525/241; 428/500; 428/515
(58) Field of Search .............................. 525/191, 199, 525/207, 213, 222, 224, 240, 241; 428/500, 515

(56) References Cited

U.S. PATENT DOCUMENTS

| | | |
|---|---|---|
| 3,456,044 A | 7/1969 | Pahlke |
| 3,645,992 A | 2/1972 | Elston |
| 4,055,454 A | 10/1977 | Laske |
| 4,087,485 A | 5/1978 | Huff |
| 4,125,985 A | 11/1978 | Laske |
| 4,264,392 A | 4/1981 | Watt |
| 4,352,849 A | 10/1982 | Mueller |
| 4,361,237 A | 11/1982 | Heiremans et al. |
| 4,365,716 A | 12/1982 | Watt |
| 4,367,312 A | 1/1983 | Bontinck et al. |
| 4,407,998 A | 10/1983 | Duvdevani |
| 4,500,648 A | 2/1985 | Malpass |
| 4,521,467 A | 6/1985 | Berger |
| 4,634,739 A * | 1/1987 | Vassilatos .................. 525/240 |
| 4,665,130 A | 5/1987 | Hwo |
| 4,798,081 A | 1/1989 | Hazlitt et al. |
| 4,820,557 A | 4/1989 | Warren |
| 4,865,902 A | 9/1989 | Golike et al. |
| 4,916,190 A | 4/1990 | Hwo |
| 4,927,708 A | 5/1990 | Herran et al. |
| 4,952,451 A | 8/1990 | Mueller |
| 4,961,513 A | 10/1990 | Gossedge et al. |
| 4,963,419 A | 10/1990 | Lustig et al. |
| 5,001,197 A | 3/1991 | Hendewerk |
| 5,026,798 A | 6/1991 | Canich |
| 5,034,074 A | 7/1991 | Thomas, Jr. |
| 5,055,438 A | 10/1991 | Canich |
| 5,064,802 A | 11/1991 | Stevens et al. |
| 5,087,667 A | 2/1992 | Hwo |
| 5,089,321 A | 2/1992 | Chum et al. |
| 5,128,414 A | 7/1992 | Hwo |
| 5,132,380 A | 7/1992 | Stevens et al. |
| 5,153,157 A | 10/1992 | Hlatky et al. |
| 5,180,599 A | 1/1993 | Feldmeier et al. |
| 5,189,192 A | 2/1993 | LaPointe et al. |
| 5,272,236 A | 12/1993 | Lai et al. |
| 5,278,272 A | 1/1994 | Lai et al. |
| 5,340,917 A | 8/1994 | Eckman et al. |
| 5,374,696 A | 12/1994 | Rosen et al. |
| 5,380,810 A | 1/1995 | Lai et al. |
| 5,407,751 A | 4/1995 | Genske et al. |
| 5,436,043 A * | 7/1995 | Hatano et al. ............. 428/35.7 |
| 5,453,410 A | 9/1995 | Kolthammer et al. |
| 5,470,993 A | 11/1995 | Devore et al. |
| 5,492,411 A | 2/1996 | May |
| 5,494,874 A | 2/1996 | Rosen et al. |
| 5,532,394 A | 7/1996 | Rosen et al. |
| 5,538,804 A | 7/1996 | Ogale |
| 5,541,236 A | 7/1996 | DeNicola, Jr. et al. |
| 5,554,668 A | 9/1996 | Scheve et al. |
| 5,596,052 A | 1/1997 | Resconi et al. |
| 5,665,800 A | 9/1997 | Lai et al. |
| 5,685,128 A | 11/1997 | Chum et al. |
| 5,703,187 A | 12/1997 | Timmers |
| 5,723,560 A | 3/1998 | Canich |
| 5,731,362 A | 3/1998 | Scheve et al. |
| 5,733,636 A | 3/1998 | May |
| H1727 H | 5/1998 | Jones et al. |
| 5,763,532 A | 6/1998 | Harrington et al. |
| 5,783,638 A | 7/1998 | Lai et al. |
| 5,834,541 A | 11/1998 | Becker et al. |
| 5,885,673 A | 3/1999 | Light et al. |
| 5,902,848 A | 5/1999 | Burgin et al. |
| 5,912,084 A | 6/1999 | Hausmann et al. |
| 5,997,968 A | 12/1999 | Dries et al. |
| 6,006,913 A | 12/1999 | Ludemann et al. |
| 6,037,417 A | 3/2000 | Nguyen et al. |
| 6,060,567 A | 5/2000 | Lai et al. |

FOREIGN PATENT DOCUMENTS

| | | |
|---|---|---|
| EP | 0 635 254 B1 | 1/1995 |
| WO | WO 97/28960 A2 | 8/1997 |

OTHER PUBLICATIONS

Search Report, Apr. 3, 2002.

* cited by examiner

Primary Examiner—Nathan M. Nutter
(74) Attorney, Agent, or Firm—Jenkens & Gilchrist a Professional Corporation

(57) ABSTRACT

A peelable seal comprises a mixture of at least two immiscible polymers. The first polymer forms a continuous phase in the peelable seal, whereas the second polymer is dispersed in the continuous phase. For example, a peelable seal can also be made from a mixture of an ethylene polymer with a melt index in the range from about 0.1 to about 20 g/10 minutes and a propylene polymer with a melt flow rate in the range from about 0.01 to about 2 g/10 minutes. The two polymers define a shear viscosity differential: $\Delta=|(\eta_1-\eta_2)/\eta_1|$, wherein $\eta_1$ and $\eta_2$ are the respective shear viscosity for the first and second polymers at a temperature of 230° C. and a shear rate of about 100 radian/second. Preferably, the shear viscosity differential is less than about 100%.

54 Claims, 3 Drawing Sheets

PEELABLE SEAL AND METHOD OF MAKING AND USING SAME

PRIOR RELATED APPLICATIONS

This application claims priority to previously filed U.S. provisional patent application Serial No. 60/259,365, filed Jan. 2, 2001, which is incorporated by referenced herein in its entirety.

FEDERALLY SPONSORED RESEARCH STATEMENT

Not applicable.

REFERENCE TO MICROFICHE APPENDIX

Not applicable.

FIELD OF THE INVENTION

The invention relates to a heat sealable and peelable film. The invention also relates to methods of making and using the heat sealable, peelable film.

BACKGROUND OF THE INVENTION

Heat sealable and peelable films (also referred to herein as "peelable seals") are ubiquitously employed on a large scale for temporarily closing containers that include, for example, food products or medical devices. During use, a consumer tears away the peelable film. To gain consumer acceptance, a number of characteristics associated with a heat sealable and peelable film are desired. For example, the film should provide a leak-proof closure of the container or bag. To seal a bag, heat sealing is commonly used. Various apparatus have been constructed for the purpose of forming bags while simultaneously filling the bags with the desired contents. These apparatus are commonly known as vertical form-fill-and-seal and horizontal form-fill-and-seal machines.

These machines typically have forming collars or bars that shape a flat piece of film into a tubular shape of a bag. Hot metal sealing jaws are moved from an open position to a closed position, contacting the film in order to seal it into a bag shape. During the sealing process, the outer layer of the film comes into direct contact with the hot metal surface of the sealing jaws. Heat is thus transferred through the outer layer of the film to melt and fuse the inner sealant layer to form a seal. Generally, the outer layer has a higher melting temperature than the inner sealant layer. As such, while the inner sealant layer is melted to form a seal, the outer layer of the film does not melt and is not stuck to the sealing jaws. After the sealing jaws reopen, the film is cooled to room temperature.

Before the inner sealant layer is cooled to room temperature, it should be able to maintain its seal integrity. The ability of an adhesive or sealant layer to resist creep of the seal while it is still in a warm or molten state is generally referred to as "hot tack." To form a good seal, the hot tack of the sealable and peelable film should be adequate.

Besides adequate hot tack, it is also desirable to have a low heat seal initiation temperature which helps to ensure fast packaging line speeds and a broad sealing window which could accommodate variability in process conditions, such as pressure and temperature. A broad sealing window also enables high speed packaging of heat sensitive products, as well as, provides a degree of forgiveness for changes in packaging or filling speeds.

In addition to the "sealable" characteristic of a sealable and peelable film, it should also have a desired "peelable" characteristic needed to provide an easily openable seal on a package or bag. Peelability generally refers to the ability to separate two materials or substrates in the course of opening a package without compromising the integrity of either of the two. The force required to pull a seal apart is called "seal strength" or "heat seal strength" which can be measured in accordance with ASTM F88-94. The desired seal strength varies according to specific end user applications. For flexible packaging applications, such as cereal liners, snack food packages, cracker tubes and cake mix liners, the seal strength desired is generally in the range of about 1–9 pounds per inch. For example, for easy-open cereal box liners, a seal strength in the range of about 2–3 pounds per inch is commonly specified, although specific targets vary according to individual manufactures requirements. In addition to flexible packaging application, a sealable and peelable film can also be used in rigid package applications, such as lidding for convenience items (e.g., snack food such as puddings) and medical devices. Typical medical packages have a seal strength of about 1–3 pounds per inch.

Additional desired characteristics for a heat sealable and peelable film include a low coefficient of friction and good abuse resistance. A low coefficient of friction ensures that the sealant layer can be processed smoothly and efficiently on fabrication and packaging equipment and is particularly important for vertical form-fill-and-seal packaging. Good abuse resistance and toughness is desired, for example, in cereal box liners to withstand tears and punctures from irregularly-shaped, rigid cereals. Additional characteristics include taste and odor performance and barrier or transmission properties.

Heat sealable and peelable films are generally made from one or more polymeric resins. The resulting characteristics of a heat sealable and peelable film depend largely upon the type of the resins used to form the film. For example, ethylene vinyl acetate (EVA) and ethylene methyl acrylate (EMA) copolymers provide excellent heat sealing properties. However, the seals produced with these copolymers are such that separation usually cannot be achieved without damage to the film. To alleviate this problem, polybutylene is mixed with an EVA polymer to produce a heat sealable and peelable film. Although the peelability of the film is improved, the heat sealable and peelable film has some unpleasant odor due to the presence of EVA. In addition to using polybutylene, some ionomers, such as SURLYN®, is mixed with EVA to produce a heat sealable and peelable film. While the film is peelable, it causes stringiness or "angel hair" upon separation of the film. Moreover, ionomers are generally expensive and may have some odor as well.

Although a number of resins systems have been employed to make a heat sealable and peelable film, there continues to exist a need for an improved heat sealable and peelable film with consistent seal strength. It is desirable that the resin system used to produce the heat sealable and peelable film has a relatively lower seal initiation temperature and a relatively broad heat sealing window. It is also desirable that the heat sealable and peelable film is relatively age-resistant and has a relatively lower coefficient of friction and good abuse resistance and toughness.

SUMMARY OF THE INVENTION

The aforementioned needs are fulfilled by embodiments of the invention in one or more of the following aspects. In one aspect, the invention relates to a peelable seal which comprises a mixture of at least two immiscible polymers; the first polymer forms a continuous phase and has a shear viscosity $\eta_1$ at a temperature of about 230° C. and a shear rate of about 100 radian/second; and the second polymer is dispersed in the continuous phase and has a shear viscosity $\eta_2$ at a temperature of about 230° C. and a shear rate of about 100 radian/second. Moreover, the two polymers define a shear viscosity differential: $\Delta=|(\eta_1-\eta_2)/\eta_1|$, and the shear viscosity differential $\Delta$ is less than about 100%. The peelable seal may be a monolayer or a multilayer. In a multi-layered peelable seal, it may include at least a base layer and a skin layer which is formed from the mixture of the at least two immiscible polymers. The peelable seal may also include two base layers and a skin layer which is formed from the mixture of the at least two immiscible polymers. In some embodiments, the shear viscosity differential $\Delta$ may be less than about 50%, less than about 30%, less than about 20%, less than about 10%, less than about 5%. The shear viscosity differential $\Delta$ may also be zero or substantially close to zero.

In some embodiments, the first polymer is an ethylene polymer. The ethylene polymer may have a melt index in the range from about 0.1 to about 20, preferably from 0.6 to about 10, and more preferably from about 1.5 to 3. In still other embodiments, the second polymer may be a propylene polymer. The propylene polymer may have a melt flow rate from about 0.01 to about 2, preferably from 0.1 to about 1, and more preferably from about 0.3 to about 0.6. In other embodiments, the first polymer is an ethylene polymer with a melt index in the range from about 1.5 to about 3, and the second polymer is a propylene polymer with a melt flow rate from about 0.3 to about 0.6.

In another aspect, the invention relates to a peelable seal which comprises a mixture of an ethylene polymer with a melt index in the range from about 0.1 to about 20 and a propylene polymer with a melt flow rate in the range from about 0.01 to about 2. Moreover, the ethylene polymer forms a continuous phase of the peelable seal, and the propylene polymer is dispersed in the continuous phase of the peelable seal. The peelable seal may be a monolayer or a multilayer. In a multi-layered peelable seal, it may include at least a base layer and a skin layer formed from the mixture of the ethylene and the propylene polymers. In some embodiments, the peelable seal may include two base layers and a skin layer formed from the mixture of the ethylene polymer and the propylene polymer. The propylene polymer is uniformly dispersed in the continuous phase of the ethylene polymer. The ethylene polymer may have a melt index in the range from about 0.6 to about 10, preferably from about 1.5 to about 3. The ethylene polymer may have a density from about 0.86 g/cc to about 0.97 g/cc, preferably from about 0.86 g/cc to about 92 g/cc, and more preferably from about 0.88 g/cc to about 0.92 g/cc. The ethylene polymer may be selected from high density polyethylene, low density polyethylene, linear low density polyethylene, very low density polyethylene, and ultra low density polyethylene. The ethylene polymer may be produced by a single site catalyst, a metallocene catalyst, a constrained geometry catalyst. The ethylene polymer may be a substantially linear ethylene polymer or an ethylene polymer with long chain branching. The propylene polymer may be a homopolymer, a copolymer, or an interpolymer. The propylene polymer may have a melt flow rate in the range from about 0.01 to about 2, preferably from about 0.1 to about 1, and more preferably from about 0.3 to about 0.5. In some embodiments, the ethylene polymer has a melt index in the range from about 1.5 to about 3, and the propylene polymer has a melt flow rate of less than about 0.6. In other embodiments, the ethylene polymer and the propylene polymer define a shear viscosity differential: $\Delta=|(\eta_e-\eta_p)/\eta_e|$, in which $\eta_e$ and $\eta_p$ are the respective shear viscosity of the ethylene polymer and the propylene polymer at a shear rate of about 100 radian/second and a temperature of about 230° C. Moreover, the shear viscosity differential $\Delta$ is than about 100%. Preferably, the shear viscosity differential $\Delta$ is less than 50%, less than 25%, less than 10%, less than 5%, or zero or substantially zero.

In yet another aspect, the invention relates to a method of making a peelable seal. As; The method includes: (a) obtaining a ethylene polymer with a melt index in the range from about 0.1 to about 20; (b) obtaining a propylene polymer with a melt flow rate in the range from about 0.01 to about 2; (c) mixing the ethylene polymer and the propylene polymer to obtain a blend therefrom, and (d) forming a peelable seal from the blend. Moreover, the ethylene polymer forms a continuous phase in the peelable seal, and the propylene polymer forms a dispersed phase in the peelable seal.

In still another aspect, the invention relates to a method of making a peelable seal. The method includes: (a) obtaining a first polymer with a shear viscosity $\eta_1$ at a temperature of about 230° C. and a shear rate of about 100 radian/second; (b) obtaining a second polymer with a shear viscosity $\eta_2$ at a temperature of about 230° C. and a shear rate of about 100 radian/second; (c) mixing the first polymer and the second polymer to form a blend; and (d) forming a peelable seal from the blend. Moreover, the first and second polymers define a shear viscosity differential $\Delta=|(\eta_1-\eta_2)/\eta_1|$ less than 100%. The first polymer forms a continuous phase in the peelable seal and the second polymer forms a dispersed phase in the peelable seal.

In yet still another aspect, the invention relates to a polymer blend composition for a peelable seal. The polymer blend composition comprises a blend of an ethylene polymer with a melt index in the range from about 0.1 to about 20 and a propylene polymer with a melt flow rate in the range from about 0.01 to about 2. The ethylene polymer is capable of forming a continuous phase of the peelable seal, and the propylene polymer is capable of being dispersed in the continuous phase of the peelable seal.

In one aspect, the invention relates to a polymer blend composition for a peelable seal. The polymer blend composition comprises a blend of at least two immiscible polymers; a first polymer capable of forming a continuous phase and a second polymer capable of being dispersed in the continuous phase. The first polymer and the second polymer have a shear viscosity $\eta_1$ and $\eta_2$ at a temperature of about 230° C. and a shear rate of 100 radian/second. Moreover, the two polymer define a shear viscosity differential: $\Delta=|(\eta_1-\eta_2)/\eta_1|$, and the shear viscosity differential is less than about 100%.

Additional aspects of the invention and characteristics and advantages provided by embodiments of the invention are apparent with the following description.

DESCRIPTION OF EMBODIMENTS OF THE INVENTION

Figure 1:
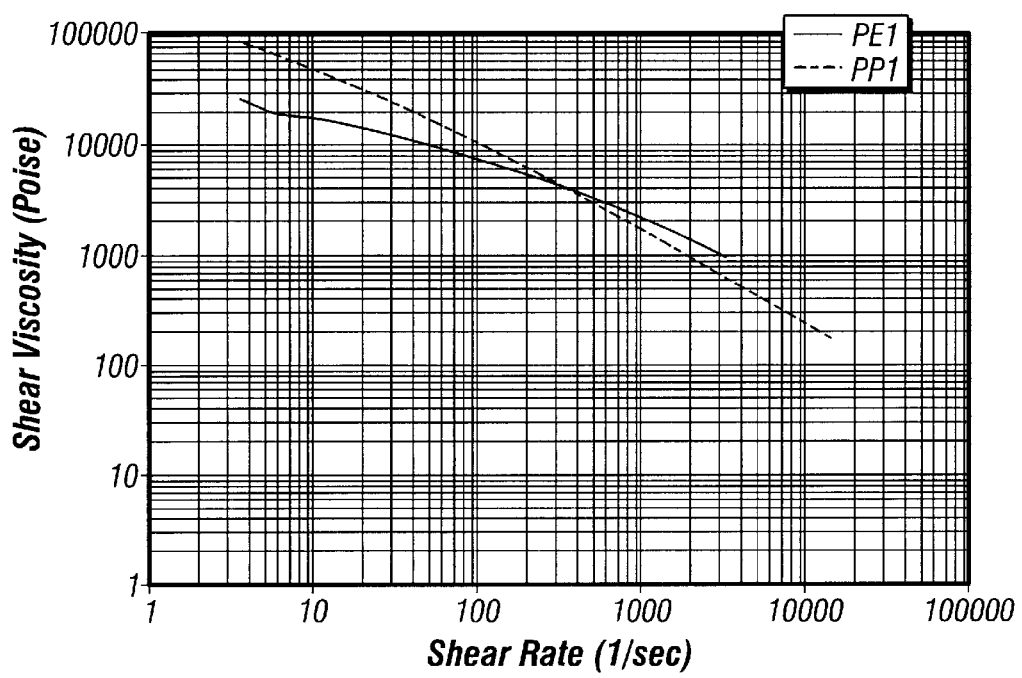
FIG. 1 is a plot of viscosity data for an ethylene polymer and a propylene polymer used in embodiments of the invention: the solid line represents the shear viscosity of the ethylene polymer as a function of shear rate 230° C., and the broken line represents the shear viscosity of the propylene polymer as a function of shear rate at 230° C.

In the following description, all numbers disclosed herein are approximate values, regardless whether the word "about" or "approximately" is used in connection therewith. They may vary by up to 1%, 2%, 5%, or sometimes 10 to 20%. Whenever a numerical range with a lower limit, $R_L$, and an upper limit $R_U$, is disclosed, any number R falling within the range is specifically disclosed. In particular, the following numbers R within the range are specifically disclosed: $R=R_L+k*(R_U-R_L)$, wherein k is a variable ranging from 1% to 100% with a 1% increment, i.e. k is 1%, 2%, 3%, 4%, 5%, ..., 50%, 51%, 52%, ..., 95%, 96%, 97% in or 100%. Moreover, any numerical range defined by two numbers, R, as defined in the above is also specifically disclosed.

Embodiments of the invention provide a peelable seal and a polymer blend for making the peelable seal. The term "peelable seal" refers to an adhesive structure which may be attached to one or more substrates. The adhesive structure can be sealed by heat or other sealing methods to provide structural support. On the other hand, the seal structure can also be peeled apart when force is applied. Generally, a peelable seal is in the form of a film or layer. A peelable seal can be a monolayer or multilayer. For example, a peelable seal may include two layers: one sealant layer and a base layer for support. In some embodiments, a peelable seal may include three layers: a sealant layer which is one of the outer layers and two base layers which may or may not have the same compositions. Multiple layer structures, such as a four layered structure, five layered structure, six layered structure, or more layers, may also be made, if desired, so long as one of the outer layers is a heat sealant layer which is made from the polymer blend described herein.

The embodiments of the invention are based, in part, on the realization that a good peelable seal can be obtained from a blend of two or more polymers with certain desired rheological and morphological characteristics. Preferably, the sealant layer in the peelable seal should include a continuous phase and at least one dispersed phase. Generally, the continuous phase and the dispersed phase are formed from at least two immiscible polymers. Two polymers are "immiscible" when they do not form a homogenous mixture after being mixed. In other words, phase separation occurs in the mixture. One method to quantify the immiscibility of two polymers is to use Hildbrand's solubility parameter which is a measure of the total forces holding the molecules of a solid or liquid together. Every polymer is characterized by a specific value of solubility parameter, although it is not always available. Polymers with similar solubility parameter values tend to be miscible. On the other hand, those with significantly different solubility parameters tend to be immiscible, although there are many exceptions to this behavior. Discussions of solubility parameter concepts are presented in (1) *Encyclopedia of Polymer Science and Technology,* Interscience, New York (1965), Vol. 3, pg. 833; (2) *Encyclopedia of Chemical Technology,* Interscience, New York (1971), Supp. Vol., pg. 889; and (3) *Polymer Handbook,* 3rd Ed., J. Brandup and E. H. Immergut (Eds.), (1989), John Wiley & Sons "Solubility Parameter Values," pp. VII-519, which are incorporated by referenced in their entirety herein.

The term "blend" herein refers to both dry blends and melt. A polymer blend need not be uniform, although it is preferred. To obtain consistent peel strength, the dispersed phase preferably should be uniformly distributed in the continuous phase. The dispersion quality can be affected by mixing conditions and equipment. Moreover, at a given mixing pressure and speed, the viscosities of the components also affect the dispersion quality. Sometimes, polymers with the same melt index may have significantly different viscosities in the high-shear stress environment of an extruder.

In embodiments of the invention, two immiscible polymers are selected such that their shear viscosities under normal processing conditions are not significantly different. For example, in the shear rate range between about 10 $s^{-1}$ to 1500 $s^{-1}$, the shear viscosities between the two polymers preferably should not differ by more than 100%. In some embodiments, the difference in shear viscosity between the two polymers are less than 50%, 30%, 20%, 10% or 5% in the aforementioned shear rate range.

One way to quantify the difference of shear viscosities between two polymers is to define a shear viscosity differential: $\eta=|(\eta_1-\eta_2)/\eta_1|$, wherein $\eta_1$ and $\eta_2$ are the respective shear viscosity at a given temperature (e.g., 230° C.) and a given shear rate (e.g., 100 $s^{-1}$) for the polymer forming the continuous phase ("the first polymer") and the polymer forming the dispersed phase ("the second polymer"). Generally, Δ should be less than 100%. In some embodiments, Δ may be a lower value, such as 50%, 30%, 20%, 10%, 5%, etc. It is also possible to have a Δ which is zero or substantially close to zero.

Any polymer which has heat sealing property may be used in embodiments of the invention to form the continuous phase (i.e., the first polymer). Preferably, the polymer has a relatively low seal initiation temperature and good hot tack strength. Suitable polymers include, but are not limited to, ethylene homopolymers and copolymers, ethylene/styrene copolymers, ethylene vinyl acetate (EVA) copolymers, ethylene methyl acrylates (EMA) copolymers, ethylene acrylic acid copolymers, ethylene methacrylic acid copolymers (such as Nucrel®), hexene-butene copolymers, ionomers (such as Surlyn®), acid anhydride modified ethylene vinyl acetate (such as Bynel®), and blends thereof.

Any polymer which is immiscible with the first polymer (i.e., the polymer forming the continuous phase) may be used to form the dispersed phase (i.e., the second polymer). Suitable polymers, but are not limited to, polybutylene, polypropylene homopolymers and copolymers, HDPE, crosslinked PE, terpolymers and blends thereof.

The polymer blend which forms a peelable seal in embodiments of the invention may include any amount of immiscible polymers. Generally, the first polymer may range from about 5% to 95% by weight. Preferably, it is present in the peelable seal from about 50% to 85%. On the other hand, the second polymer may be present from about 5% to 95% by weight. Preferably, it is present from about 10% to about 50%. More preferably, it is present from about 20% to 40% by weight.

In some embodiments, peelable seals are formed from a polymer blend that includes an ethylene polymer and a propylene polymer. The ethylene polymer forms the continuous phase in the peelable seal, whereas the propylene polymer is dispersed in the continuous phase of the peelable seal. The ethylene polymer may have a melt index in the range from about 0.1 to 20 g/10 min., preferably from about 0.6 to 10 g/10 min., and more preferably from about 1.5 to about 3 g/10 min. The propylene polymer may have a melt flow rate in the range from about 0.01 to about 2 g/10 min., preferably from about 0.1 to 1 g/10 min., and most preferably from about 0.3 to about 0.5 g/10 min. In other embodiments, a propylene polymer with a melt flow rate of less than 0.5 g/10 min. is blended with an ethylene polymer with a melt index in the range from about 1.5 to about 3 g/10 min.

A peelable seal obtained from the ethylene polymer/propylene polymer blend as described above has one or more of the following characteristics. First, the peelable seal is substantially odor-free, which is an improvement over a peelable seal made from ethylene vinyl acetate (EVA) copolymers or ionomers. Moreover, the peelable seal gives a relatively clean peel. In other words, upon peeling, the peelable seal does not produce excessive stringiness (i.e., no substantial amount of angel hair). As will be demonstrated below, the ethylene polymer/propylene polymer blend produces a peelable seal which has a consistent peel strength over a relatively wide temperature window. Such blends also have good hot tack properties.

The following is a description of suitable ethylene polymers and propylene polymers that may be used in embodiments of the invention.

ETHYLENE POLYMERS

An ethylene polymer is any polymer comprising greater than fifty mole percent of —$CH_2CH_2$— repeating units as derived from an ethylene monomer or comonomer. Suitable ethylene polymers for use in embodiments of the invention include any ethylene-containing polymers, both homopolymers and copolymers. Examples of ethylene polymers include, but are not limited to, ethylene homopolymers and ethylene interpolymers, such as low density polyethylene (LDPE), heterogeneously branched ethylene/α-olefin interpolymer (i.e., linear low density polyethylene (LLDPE), ultra low density polyethylene (ULDPE)), substantially linear ethylene polymers (SLEP), and homogeneously branched ethylene polymer.

In some embodiments, the ethylene polymers are homogeneously branched ("homogeneous") ethylene polymers, such as homogeneously branched linear ethylene/α-olefin interpolymers as described by Elston in U.S. Pat. No. 3,645,992 or homogeneously branched substantially linear ethylene polymers as described by Lai et al. in U.S. Pat. Nos. 5,272,236, 5,278,272, 5,665,800 and 5,783,638, the disclosures of which are incorporated herein by reference. Homogeneously branched polymers are ethylene interpolymers in which the comonomer is randomly distributed within a given interpolymer molecule and substantially all of the interpolymer molecules have the same ethylene/comonomer ratio, whereas heterogeneous interpolymers are those in which the interpolymer molecules do not have the same ethylene/comonomer ratio.

Homogeneous interpolymers can also be characterized by their SCBDI (Short Chain Branch Distribution Index) or CDBI (Composition Distribution Branch Index). The SCBDI or CBDI is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.,* Vol. 20, p. 441 (1982), in U.S. Pat. No. 4,798,081 (Hazlitt et al.), or U.S. Pat. No. 5,089,321 (Chum et al.), all disclosures of which are incorporated herein by reference. Homogeneously branched linear ethylene interpolymers have a homogeneous (or narrow) short branching distribution (i.e., the polymer has a relatively high SCBDI or CDBI) but does not have long chain branching. That is, the ethylene interpolymer has an absence of long chain branching and a linear polymer backbone in the conventional sense of the term "linear." The SCBDI or CDBI for the homogeneous interpolymers and copolymers is preferably greater than about 50 percent, more preferably equal to or greater than about 70 percent. Homogeneous interpolymers and polymers generally have a degree of branching less than or equal to 2 methyls/1000 carbons in about 15 percent (by weight) or less, preferably less than about 10 percent (by weight), and especially less than about 5 percent (by weight).

In some embodiments, substantially linear ethylene polymers with long-chain branching are used. The term "substantially linear ethylene polymer" as used herein means that the bulk ethylene polymer is substituted, on average, with about 0.01 long chain branches/1000 total carbons to about 3 long chain branches/1000 total carbons (wherein "total carbons" includes both backbone and branch carbons). Some substantially linear ethylene polymers are substituted with about 0.01 long chain branches/1000 total carbons to about 1 long chain branches/1000 total carbons, preferably from about 0.05 long chain branches/1000 total carbons to about 1 long chain branched/1000 total carbons, and more preferably from about 0.3 long chain branches/1000 total carbons to about 1 long chain branches/1000 total carbons.

Long chain branching (LCB) may be defined herein as a chain length of at least about 6 carbons, above which the length cannot be distinguished by using $^{13}C$ nuclear magnetic resonance spectroscopy. Alternatively, LCB may be defined as a chain length of at least one (1) carbon less than the number of carbons in the comonomer. For example, an ethylene/1-octene polymer may have backbones with long chain branches of at least seven (7) carbons in length, but it also may have short chain branches of only six (6) carbons in length. Sometimes, a long chain branch can be as long as the polymer backbone.

Long chain branching can be distinguished from short chain branching by using $^{13}C$ nuclear magnetic resonance (NMR) spectroscopy and to a limited extent, e.g. for ethylene homopolymers, it can be quantified using the method of Randall, (*Rev. Macromol.Chem. Phys.,* C29 (2&3), p. 285–297), the disclosure of which is incorporated herein by reference. However as a practical matter, current $^{13}C$ nuclear magnetic resonance spectroscopy cannot determine the length of a long chain branch in excess of about six (6) carbon atoms and as such, this analytical technique cannot distinguish between a seven (7) carbon branch and a seventy

(70) carbon branch. As noted previously, long chain branches can be as long as a polymer backbone.

Although conventional $^{13}C$ nuclear magnetic resonance spectroscopy cannot determine the length of a long chain branch in excess of six carbon atoms, there are other known techniques useful for quantifying or determining the presence of long chain branches in ethylene polymers, including ethylene/1-octene interpolymers. For example, U.S. Pat. No. 4,500,648, incorporated herein by reference, teaches that long chain branching frequency (LCB) can be represented by the equation LCB=b/$M_W$ wherein b is the weight average number of long chain branches per molecule and $M_W$ is the weight average molecular weight. The molecular weight averages and the long chain branching characteristics are determined by gel permeation chromatography and intrinsic viscosity methods, respectively.

For substantially linear ethylene polymers, the long chain branch is longer than the short chain branch that results from the incorporation of the α-olefin(s) into the polymer backbone. The empirical effect of the presence of long chain branching in the substantially linear ethylene polymers used in the invention is manifested as enhanced rheological properties which are quantified and expressed herein in terms of gas extrusion rheometry (GER) results and/or melt flow, $I_{10}/I_2$, increases.

The substantially linear ethylene polymers used in embodiments of the invention are disclosed in the following U.S. Pat. Nos. 5,272,236; 5,278,272; 5,783,638; and 6,060,567. The disclosure of all of the preceding patents are incorporated by reference herein in their entirety.

Metallocene single site polymerization catalysts (for example, the monocyclo-pentadienyl transition metal olefin polymerization catalysts described by Canich in U.S. Pat. No. 5,026,798 or by Canich in U.S. Pat. No. 5,055,438) or constrained geometry catalysts (for example, as described by Stevens et al. in U.S. Pat. No. 5,064,802) can be used to manufacture substantially linear ethylene polymers in a manner consistent with the methods described in U.S. Pat. No. 5,272,236 and in U.S. Pat. No. 5,278,272. Additional polymerization methods are also described in PCT/US 92/08812 (filed Oct. 15, 1992). Preferably, the substantially linear ethylene polymers are manufactured using suitable constrained geometry catalysts, especially constrained geometry catalysts as disclosed in U.S. application Ser. Nos. 545,403, filed Jul. 3, 1990; U.S. Pat. Nos. 5,132,380; 5,064,802; 5,153,157; 5,470,993; 5,453,410; 5,374,696; 5,532,394; 5,494,874; 5,189,192; the disclosures of all of which are incorporated herein by reference in their entirety. Both metallocene and constrained geometry catalysts may be referred to as single-site catalysts in the art.

The substantially linear ethylene polymers used in embodiments of the invention are interpolymers of ethylene with at least one $C_3$–$C_{20}$ α-olefin and/or $C_4$–$C_{18}$ diolefin. Copolymers of ethylene and an α-olefin of $C_3$–$C_{20}$ carbon atoms are especially preferred. The term "interpolymer" is used herein to indicate a copolymer, or a terpolymer, or the like, where at least one other comonomer is polymerized with ethylene to make the interpolymer.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$ α-olefins such as propylene, isobutylene, 1-butene, 1-hexene, 1-pentene, 4-methyl-1-pentene, 1-heptene, 1-octene, 1-nonene, 1-decene, and the like. Preferred comonomers include propylene, 1-butene, 1-pentene, 1-hexene, 4-methyl-1-pentene, 1-heptene, and 1-octene, and 1-heptene and 1-octene are especially preferred and 1-octene is most especially preferred.

Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

The substantially linear ethylene polymers typically are characterized by a single melting peak as determined using differential scanning calorimetry (DSC). However, the single melt peak may show, depending on equipment sensitivity, a "shoulder" or a "hump" on the side lower of the melting peak (i.e. below the melting point) that constitutes less than 12 percent, typically less than 9 percent, more typically less than 6 percent, of the total heat of fusion of the polymer. This shoulder generally occurs within 34° C., typically within 27° C., and more typically within 20° C. of the melting point of the single melting peak.

The single melting peak is determined by using a differential scanning calorimeter standardized with indium and deionized water. The method involves about 5–7 mg sample sizes, a "first heat" to about 150° C. which is held for 4 minutes, a cool down at 10° C./min. to −30° C. which is held for 3 minutes, and heat up at 10° C./min. to 150° C. to provide a "second heat" heat flow vs. temperature curve. Total heat of fusion of the polymer is calculated from the area under the curve. The heat of fusion attributable to a shoulder or hump artifact, if present, can be determined using an analytical balance and weight-percent calculations.

The molecular weight distributions of ethylene polymers are determined by gel permeation chromatography (GPC) on a Waters 150° C. high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science,* Polymer Letters, Vol. 6, p. 621, 1968, the disclosure of which is incorporated herein by reference) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_j = (\Sigma w_i(M_i^j))^j$; where $w_i$ is the weight fraction of the molecules with molecular weight $M_i$ eluting from the GPC column in fraction i and j=1 when calculating $M_w$ and j=−1 when calculating $M_n$.

For the ethylene polymers used in embodiments of the invention, the $M_w/M_n$ is preferably less than 3.5, more preferably less than 3.0, most preferably less than 2.5, and especially in the range of from about 1.5 to about 2.5 and most especially in the range from about 1.8 to about 2.3.

The density of the ethylene polymers suitable for use in embodiments of the invention is generally less than 0.93 grams/centimeter (g/cc), more preferably in the range from about 0.86 g/cc to about 0.92 g/cc, and most preferably in the range from about 0.88 g/cc to about 0.9 g/cc, as measured in accordance with ASTM D-792.

The molecular weight of the ethylene polymers can be conveniently determined using a melt index measurement according to ASTM D-1238, Condition 190° C./2.16 kg (formerly known as "Condition E" and also known as $I_2$). Melt index is inversely proportional to the molecular weight of the polymer. Thus, the higher the molecular weight, the lower the melt index, although the relationship is not linear.

Preferably, the $I_2$ melt index of the ethylene polymers are in the range of from about 0.01 to about 50 g/10 minutes, more preferably from about 0.1 to about 20 g/10 minutes, and most preferably from about 0.4 and about 12 g/10 minutes.

Other measurements useful in characterizing the molecular weight of ethylene polymer compositions involve melt index determinations with higher weights, such as, ASTM D-1238, Condition 190° C./10 kg (formerly known as "Condition N" and also known as $I_{10}$). The ratio of a higher weight melt index determination to a lower weight determination is known as a melt flow ratio, and for measured $I_{10}$ and the $I_2$ melt index values the melt flow ratio is designated as $I_{10/I2}$. Preferably, the ethylene polymers have an $I_{10}/I_2$ melt flow ratio greater than or equal to 6.8, more preferably greater than or equal to 8, and most preferably in the range of from about 8.5 to about 20 and especially in the range of about 9 to about 15.

Propylene Polymers

Propylene polymers suitable for use in embodiments of the invention may be either homopolymers or copolymers (random or impact). Propylene may be copolymerized with one or more monomers, such as an olefin. Suitable olefins include, but are not limited to, ethylene and alpha olefins, which include propylene, 1-butene, 1-pentene, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, and the like. Preferred olefins and alpha olefins for copolymerization with propylene include ethylene, 1-butene, and other higher alpha olefins with at least 3 to about 20 carbon atoms, more preferably ethylene, butylene, and higher alpha olefins, most preferably ethylene. The comonomers or combination of comonomers, are used in any relative quantities within the definitions of the polymers. For propylene polymers, the comonomer content is preferably less than about 35%, more preferably between about 2–30%, and most preferably between about 5–20% by weight.

The propylene polymers may be atactic, syndiotactic, or isotactic. Isotacticity can be measured by $C^{13}$ NMR. In some embodiments, the isotacticity of a propylene polymer is at least about 50 percent.

The propylene polymers are characterized by a melt flow rate, which is measured by ASTM D1238L at 230° C./2.16 kg. The melt flow rate of the propylene polymers is preferably between about 0.01 to about 2 g/10 minutes, more preferably between about 0.1 to about 1 g/10 minutes, and most preferably between about 0.3 to about 0.5 g/10 minutes.

Suitable propylene polymers may have any molecular weight distribution (MWD). MWD is calculated as the ratio $M_w/M_n$, where $M_w$ is the weight average molecular weight and $M_n$ is the number average molecular weight. Preferably, the MWD of a propylene polymer is between about 1.5 to about 8, more preferably between about 2 to about 5. Polymers with a MWD less than about 3 are generally made by using a metallocene or constrained geometry catalyst or using electron donor compounds with Ziegler Natta catalysts.

In addition to propylene polymers described above, other propylene polymers described in the following U.S. Pat. Nos. may also be used in embodiments of the invention: U.S. Pat. Nos. 6,037,417; 5,902,848; 5,834,541; 5,763,532; 5,731,362; 5,723,560; 5,596,052; 5,554,668; 5,541,236, 5,538,804; 5,340,917; 5,001,197; 4,407,998; and 4,087,485. The disclosures of the all of the preceding patents are incorporated by reference herein in their entirety.

Peelable Seals

The peelable seals in accordance with embodiments of the invention may be made by any method, including but not limited to, lamination and co-extrusion techniques or combinations thereof. For example, a peelable seal may be made by blown film techniques, cast film techniques, extrusion coating, injection molding, blow molding, transforming, profile extrusion, protrusion, compression molding, rotomolding, injection blow molding, and combination thereof. Simply blown bubble film processes are described, for example, in *Encyclopedia of Chemical Technology,* Kirk-Othmer 3rd Ed., John Wiley & Sons, New York, (1981), Vol. 16, pp. 416–417 and Vol. 18, pp. 191–192, the disclosures of which are incorporated by reference in their entirety herein. Processes for manufacturing bi-axially oriented film, such as the "double bubble" process, are described in the following U.S. Pat. Nos.: 3,456,044; 4,865,902; 4,352,849; 4,820,557; 4,927,708; 4,963,419; and 4,952,451. PCT Application WO 97/28960 and U.S. Pat. No. 4,665,130 disclose various methods for making a peelable seal which can be used in embodiments of the invention. The disclosures of the PCT application and the U.S. patent are incorporated by reference in their entirety herein.

As mentioned above, the peelable seal may be a monolayer film or a multi-layered film. A multi-layered film includes two or more layers. The first layer is a base layer or a barrier layer which comprises a gas, aroma and/or moisture barrier material, such as high density polyethylene, medium density polyethylene, low density polyethylene, linear low density polyethylene, polypropylene, nylon, ethylene vinyl alcohol copolymers, polyester, polyacrylonitrile, polyvinylidene chloride, and blends thereof. Generally, the base layer is made of a material that has a higher melting point than the sealant layer. Preferably, high density polyethylene is used as the base layer. In some embodiments, two high density polyethylene layers are co-extruded with a sealant layer, which is formed from a polymer blend in accordance with embodiments of the invention. In addition to a base or barrier layer, additional layers may be provided to the peelable seal to obtain the desired property, such as puncture resistance, tear resistance, opacity level, etc. It is also possible to include a color component (such as titanium oxide) in one or more of the base layers. Monolayer and multilayer peelable seals may be made according to the film structures and fabrication methods described in U.S. Pat. No. 5,685,128, which is incorporated by reference herein in its entirety.

The thickness of the peelable seal may range from about 0.3 mil to about 20 mil, preferably from about 0.4 to 12 mil, more preferably from about 1 mil to about 3 mil. The sealant layer should preferably comprise about 3 to 80 percent of the total thickness of the peelable seal. In embodiments where there are two or more sealant layers, it is preferred that each sealant layer ranges from about 3% to about 40% based upon the total thickness of the peelable seal. In embodiments where the peelable seal is formed by a blown film method, substantially the same thickness is obtained for each layer of the peelable seal.

The peelable seal in accordance with embodiments of the invention has many useful applications. For example, it can be used in packages formed via form/fill/seal machinery, cook-in food packages, compression filled packages, heat sealable stretch wrap packaging films (such as fresh produce packaging and fresh red meat packaging). It also may be used in cereal box liners, cake mix packages, cracker tubes, medical devices, and item packaging, snack food convenience packages gaskets, etc.

The following examples are given to illustrate various embodiments of the invention described herein. They should not be construed to limit the invention otherwise as described and claimed herein. All numerical values are approximate.

EXAMPLE 1

In this example, the shear viscosity data for an ethylene polymer and a propylene polymer were obtained. The ethylene polymer chosen in this example was an ethylene/octene copolymer designated hereinafter as "PE1." An example of PE1 resin is available from The Dow Chemical Company under the trademark of AFFINITY® PF1140, which is a homogeneous substantially linear ethylene interpolymer. This ethylene polymer was chosen due to its good seal performance, optical properties, abuse resistance, and low off-taste and off-odor. It also has good hot tack strength. It is produced by the Dow constrained geometry catalyst as disclosed in U.S. Pat. Nos. 5,272,236; 5,380,810; and 5,783,638. These patents also describe the characteristics of such polymers. The disclosures of all of the preceding patents are incorporated by reference in their entirety herein. Table 1 lists some physical properties of PE1 resin.

TABLE 1

Physical Properties of PE1 Resin

| Physical Properties | Test Method | Values |
|---|---|---|
| Resin Properties | | |
| Melt Index, g/10 min | ASTM D 1238 | 1.60 |
| Density, g/cc | ASTM D 792 | 0.8965 |
| DSC Melting Point, ° F. (° C.) | Dow Method | 205 (96) |
| Vicat Softening Point, ° F. (° C.) | ASTM D 1525 | 170 (77) |
| Film Properties, 2.0 mil (51 μm) | | |
| Puncture Resistance, ft-Ibf-in.$^3$(J/cm$^3$) | Dow Method | 245 (2) |
| Energy, in.-Ibf (J) | | 72.4 (8) |
| Force, Ibf (N) | | 18.8 (83) |
| Dart Impart (Method B), g | ASTM D 1709 | >850 |
| Elmendorf Tear[1], g  MD | ASTM D 1922 | 470 |
| CD | | 620 |
| Tensile Yield, psi (MPa)  MD | ASTM D 882 | 840 (5.8) |
| CD | | 920 (6.3) |
| Ultimate Tensile, psi (MPa)  MD | ASTM D 882 | 7290 (50) |
| CD | | 5730 (40) |
| Ultimate Elongation, %  MD | ASTM D 882 | 690 |
| CD | | 700 |
| Tensile Modulus, 2% Secant, psi (MPa)  MD | ASTM D 882 | 10560 (73) |
| CD | | 10610 (73) |
| Clarity | ASTM D 1746 | 70 |
| Gloss, 20° | ASTM D 2457 | 134 |
| Haze, % | ASTM D 1003 | 1.3 |
| Seal Initiation Temperature[2][3], ° F. (° C.) | Dow Method | 178 (81) |

TABLE 1-continued

Physical Properties of PE1 Resin

| Physical Properties | Test Method | Values |
|---|---|---|
| Ultimate Seal Strength (Ib/in) | | 6.1 |
| Hot tack Strength (N/in) | | 7.5 ??? |
| MWD | | ??? |

[1]Modified rectangular test specimen.
[2]Temperature at which 2 lb/in. (8.8 N/25.4 mm) heat seal is achieved.
[3]Heat seal strengths, Topwave HT Tester 0.5 S dwell, 40 psi bar pressure, pull speed 10 in./min. (250 mm/sec.).

The propylene polymer selected for the viscosity measurement was a propylene homopolymer designated herein as "PP1." An example of PP1 resin is available from The Dow Chemical Company as PP II103-00 polypropylene. Another propylene homopolymer designated hereinafter as "PP2" which is comparable to PP1 is available from Montell under the tradename of Pro-fax™ 6823 polypropylene. Table 2 and Table 3 list some physical properties of PP1 resin and PP2 resin, respectively.

TABLE 2

Physical Properties of PP1 Resin

| | English | | |
|---|---|---|---|
| Physical Properties | Value | Units | Test Method |
| Melt Flow Rate, 230° C./2.16 kg | 0.5 | g/10 min | ASTM D 1238 |
| Density (g/cc) | 0.90 | g/cm$^3$ | ASTM D 792B |
| Tensile Strength at Yield | 5200 | psi | ASTM D 638 |
| Elongation at Yield | 13.0 | % | ASTM D 638 |
| Flexural Modulus (0.0t in/min., 1% secant) | 230,000 | psi | ASTM D 790A |
| Deflection Temperature Under Load @ 66 psi (0.45 Mpa), unannealed | 201 | ° F. | ASTM D 648 |
| Notched Izod @ 73° F. (23° C. | 3.0 | ft-lb/in | ASTM D 256A |

TABLE 3

Physical Properties of PP2 Resin

| Physical Properties | Nominal Values (English) | Test Method |
|---|---|---|
| Density-Specific Gravity | 0.9000 sp gr 23/23° C. | ASTM D 792 |
| Melt Flow Rate (230° C./2.16 kg-L) | 0.500 g/10 min. | ASTM D 1238 |
| Water Absorption @ 24 hrs. | 0.030% | ASTM D 570 |
| Water Absorption @ Sat. | 0.200% | ASTM D 570 |
| Mechanical | | |
| Tensile Strength @ Yield | 4800 psi | ASTM D 638 |
| Tensile Elongation @ Yield | 13% | ASTM D 638 |
| Flexural Modulus, 1% Secant | 180000 psi | ASTM D 790$^2$ |
| Impact | | |
| Notched Izod Impact (73° F.) | 1.50 ft-lb/in | ASTM D 256 |
| Hardness | | |
| Rockwell Hardness (R-Scale) | 86.0 | ASTM D 785 |
| Thermal | | |
| DTUL @ 66 psi-Unannealed | 205° F. | ASTM D 648 |
| Max. Continuous Use Tmp | 220° F. | ASTM D 794 |
| Melting Point | 334° F. | |

TABLE 3-continued

Physical Properties of PP2 Resin

| | Nominal Values (English) | Test Method |
|---|---|---|
| Ignition Characteristics | | |
| Flame Rating - UL (0.0580 in., NC) UL 746 | HB | UL 94 |
| Rel Temp Indx Mech w/olmp (0.0580 in) | 230° F. | UL 746 |
| Rel Temp Indx Mech w/Imp (0.0580 in) | 230° F. | UL 746 |
| Rel Temp Indx Elect (0.0580 in) | 230° F. | UL 746 |

The shear viscosity data for each polymer were obtained on a Rheometrics Mechanical Spectrometer (Model RMS800). A frequency sweep with five logarithmically spaced points per decade was run from 0.1 to 15,000 rad/s at 230C. The strain was determined to be within the linear viscoelastic regime by performing a strain sweep at 0.1 rad/s and 230° C., by strain sweep from 2 to 30 percent strain in 2 percent steps to determine the minimum required strain to produce torques within the specification of the transducer; another strain sweep at 100 rad/s and 230° C. was used to determine the maximum strain before nonlinearity occurred according to the procedure disclosed by J. M. Dealy and K. F. Wissbrun, "Melt Rheology and Its Role in Plastics Processing", Van Nostrand, N.Y. (1990). All testing was performed in a nitrogen purge to minimize oxidative degradation. The viscosity data for the PE1 resin and the PP2 resin are summarized in Table 4 and Table 5, respectively.

TABLE 4

Dynamic Shear Viscosity data for PE1 Resin

| Shear Rate (1/sec) | Shear Viscosity (Poise) |
|---|---|
| 3.54 | 25274 |
| 6 | 18688 |
| 11.07 | 17110 |
| 12.35 | 16321 |
| 25.56 | 12827 |
| 39.24 | 10993 |
| 67.62 | 8790 |
| 127.45 | 6672 |
| 206.7 | 5335 |
| 341.79 | 4135 |
| 560.69 | 3149 |
| 736.41 | 2595 |
| 963.85 | 2239 |

TABLE 4-continued

Dynamic Shear Viscosity data for PE1 Resin

| Shear Rate (1/sec) | Shear Viscosity (Poise) |
|---|---|
| 1702.31 | 1537 |
| 3122.5 | 993 |

TABLE 5

Dynamic Shear Viscosity data for PP1 Resin

| Shear Rate (1/sec) | Shear Viscosity (Poise) |
|---|---|
| 3.78 | 80336 |
| 6.5 | 58024 |
| 12.22 | 41594 |
| 13.71 | 38761 |
| 29.4 | 24150 |
| 46.48 | 17617 |
| 84.21 | 11680 |
| 173.33 | 6828 |
| 312.06 | 4337 |
| 614.62 | 2513 |
| 1386.25 | 1266 |
| 2528.58 | 763 |
| 3600.48 | 551 |
| 5734.1 | 377 |
| 9134.55 | 257 |
| 14468.6 | 174 |

The shear viscosity data for the ethylene copolymer and the polypropylene are plotted as a function of shear rate in FIG. 1. Both the x axis and the y axis in FIG. 1 are in the logarithmic scale. Referring to FIG. 1, the broken line represents the polypropylene, and the solid line represents the ethylene copolymer. It is seen that the viscosity curve of the ethylene polymer crosses that of the polypropylene in the shear rate range from 10 $s^{-1}$ to 12,000 $s^{-1}$. The shear viscosities for the two polymers are substantially "matched" at a shear rate of about 300 $s^{-1}$.

EXAMPLE 2

In this example, the shear viscosity of another type of polypropylene is compared with that of the PE1 resin. A propylene homopolymer designated hereinafter as "PP3" was obtained from Montell as KS353P polypropylene with a density of 0.88 g/cc and a melt flow rate of 0.45 g/10 min. Additional physical property data for the PP3 resin are listed in Table 6 below.

TABLE 6

Physical Properties of PP3 Resin

| | ASTM Method | KS-353P |
|---|---|---|
| Typical Resin Properties | | |
| Melt Flow Rate, g/10 min | D 1238 | 0.45 |
| Density at 23° C., g/cm³ | D 792 | 0.88 |
| Typical Blown Film Properties[a] | | |
| Haze, % | D 1003 | 58 |
| Gloss, 45° | D 523 | 9 |
| Water Vapor Transmission Rate, At 38° C. and 100% RH, g/100 in²/day | E96 (E) | 3.1 |

TABLE 6-continued

Physical Properties of PP3 Resin

|  | ASTM Method | KS-353P |
|---|---|---|
| Tensile Strength at Yield, Machine Direction, psi (MPa) | D 882 | 1,600 (11) |
| Tensile Strength at Yield, Transverse Direction, psi (MPa) | D 882 | 1,000 (7) |
| Tensile Strength at Break, Machine Direction, psi (MPa) | D 882 | 3,700 (26) |
| Tensile Strength at Break, Transverse Direction, psi (MPa) | D 882 | 1,500 10) |
| Tensile Elongation at Yield, Machine Direction, % | D 882 | 46 |
| Tensile Elon ation at Yield, Transverse Direction, % | D 882 | 21 |
| Tensile Elongation at Break, Machine Direction, % | D 882 | 420 |
| Tensile Elongation at Break, Transverse Direction, % | D 882 | 550 |
| Tensile Modulus, 2% Secant, Machine Direction, psi (MPa) | D 882 | 12,000 (85) |
| Tensile Modulus, 2% Secant, Transverse Direction, psi (MPa) | D 882 | 11,000 (78) |
| Elmendorf Tear Strength, Machine Direction, g | D 1922A | 410 |
| Elmendorf Tear Strength, Transverse Direction, g | D 1922A | 530 |
| Dart Impact, g | D 1709A | 730 |

[a]The blown film property values shown were determined on 1.0 mil thickness film extruded at 460° F., 2.5:1 BUR, with a 60 mil die gap. They are based on a limited number of tests and may vary greatly depending upon extrusion conditions.

The shear viscosity of this polypropylene was measured according to the procedure described in Example 1. The data obtained for the PP3 resin are summarized in Table 7.

TABLE 7

Dynamic Shear Viscosity Data for PP3 Resin

| Shear Rate (rad/sec) | Shear Viscosity (Poise) |
|---|---|
| 2.9823 | 99023 |
| 7.4557 | 74802 |
| 14.911 | 52628 |
| 29.823 | 36374 |
| 74.557 | 20353 |
| 149.11 | 12978 |
| 298.23 | 8043 |
| 745.57 | 3820 |
| 1491 | 2088 |
| 2982 | 1142 |

Figure 2:
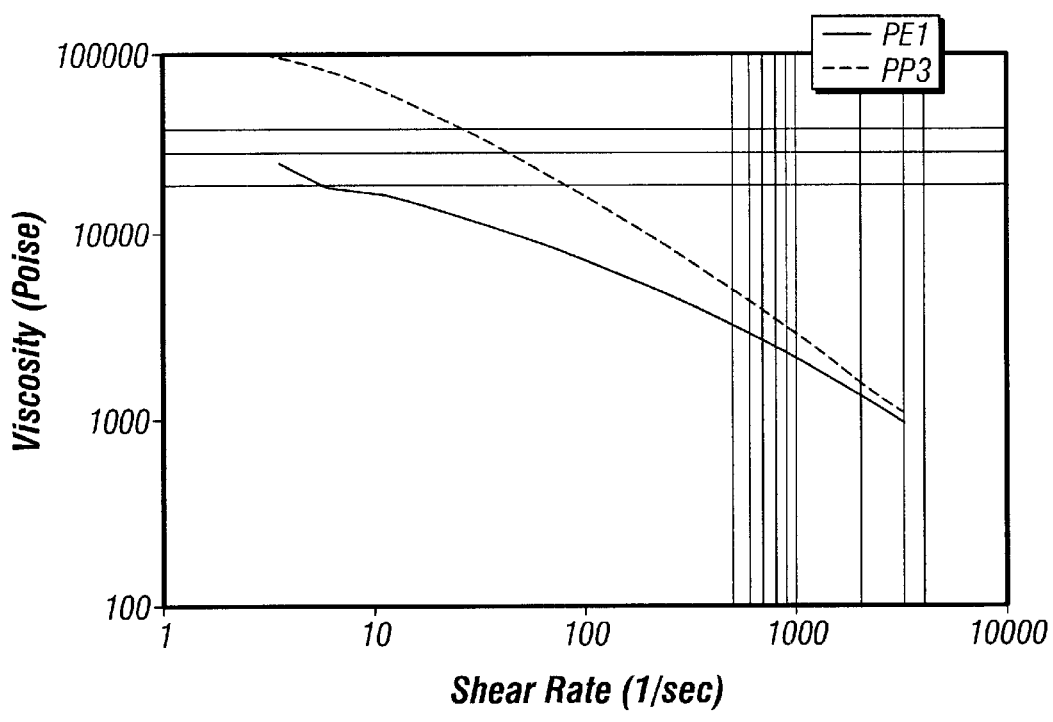
FIG. 2 is a plot of viscosity data for the ethylene polymer of FIG. 1 and another propylene polymer: the solid line represents the ethylene polymer, and the broken line the propylene polymer.

The viscosity data for both the PP3 resin and the PE1 resin are plotted as a function of shear rate in FIG. 2. Both x axis and y axis in FIG. 2 are in the logarithmic scale. Referring to FIG. 2, the solid line represents the viscosity curve for the ethylene/octene copolymer, and the broken line represents the viscosity curve for the polypropylene. As can be seen, the two viscosity curves do not cross in the shear rate range from 10 to 12,000 $s^{-1}$.

EXAMPLE 3

In this example, three types of peelable seals were prepared for comparison of heat seal performance. Sample 1 was made from 100% PE1 resin (the same polymer used in Example 1). Sample 2 was prepared from a blend of 65% PE1 and 35% PP3 (the same as Example 2). The third sample was made from 65% PE1 and 35% PP1 (the same polypropylene used in Example 1). Peelable seals were made substantially according the following procedure.

To obtain the desired percentage of polyethylene and polypropylene, the two polymer components were dry blended by weight percentage. Then the two components were fed into a 63.5 mm single screw extruder for use as the sealant layer in a three layer co-extruded film. Films were fabricated using an Egan three layer co-extrusion blown film line. The resin for the sealant layer in a peelable seal was fed to a 63.5 mm single flight double mix screw extruder with a 24:1 length to diameter ratio and a melt temperature of 380° to 400° C. The polymer flew through a screen configuration (20/40/60/20 mesh). The extruded polymers moved through a transfer pipe into a 20.3 cm (8 inches) die with a 1.78 mm (70 mil) die gap. The total film thickness was 50 microns (2.0 mils) with the sealant layer accounting for about 20% of the structure. The two other layers included high density polyethylene. A 2.25:1 blow up ratio was used.

Before analysis, each sample was stored at 25° C. for 24 hours. 1"×6" specimens were positioned lengthwise on a hot tack tester and sealed with a dwell time of 0.2 seconds. The sealed specimens were then stored for 24 hours. The specimens were then pulled, one at a time, at 10 inches per minute to their breaking point on an Instron Tester. The machine then used the dimensions of the specimen and the force exerted to calculate the seal strength of the specimen. The seal strength was obtained as a function of seal bar temperature. The data obtained for the three samples are summarized in Table 8.

TABLE 8

Heat Seal Strength Data

| 100% PE1 | | 65% PE1/35% PP1 | | 65% PE1/35% PP3 | |
|---|---|---|---|---|---|
| Temp (° C.) | Heat Seal Strength (lb/in) | Temp (° C.) | Heat Seal Strength (lb/in) | Temp (° C.) | Heat Seal Strength (lb/in) |
| 80 | 0.70 | 80 | 0.79 | 80 | |
| 90 | 2.98 | 90 | 2.34 | 90 | 0.16 |
| 100 | 5.17 | 100 | 3.01 | 100 | 1.11 |
| 110 | 6.32 | 110 | 4.30 | 110 | 1.36 |

TABLE 8-continued

Heat Seal Strength Data

| 100% PE1 | | 65% PE1/35% PP1 | | 65% PE1/35% PP3 | |
| --- | --- | --- | --- | --- | --- |
| Temp (° C.) | Heat Seal Strength (lb/in) | Temp (° C.) | Heat Seal Strength (lb/in) | Temp (° C.) | Heat Seal Strength (lb/in) |
| 120 | 7.11 | 120 | 5.45 | 120 | 1.93 |
| 130 | 7.42 | 130 | 6.67 | 130 | 1.88 |
| 140 | 6.82 | 140 | 7.29 | 140 | 5.00 |
| 150 | 6.72 | 150 | 7.39 | 150 | — |

Figure 3:
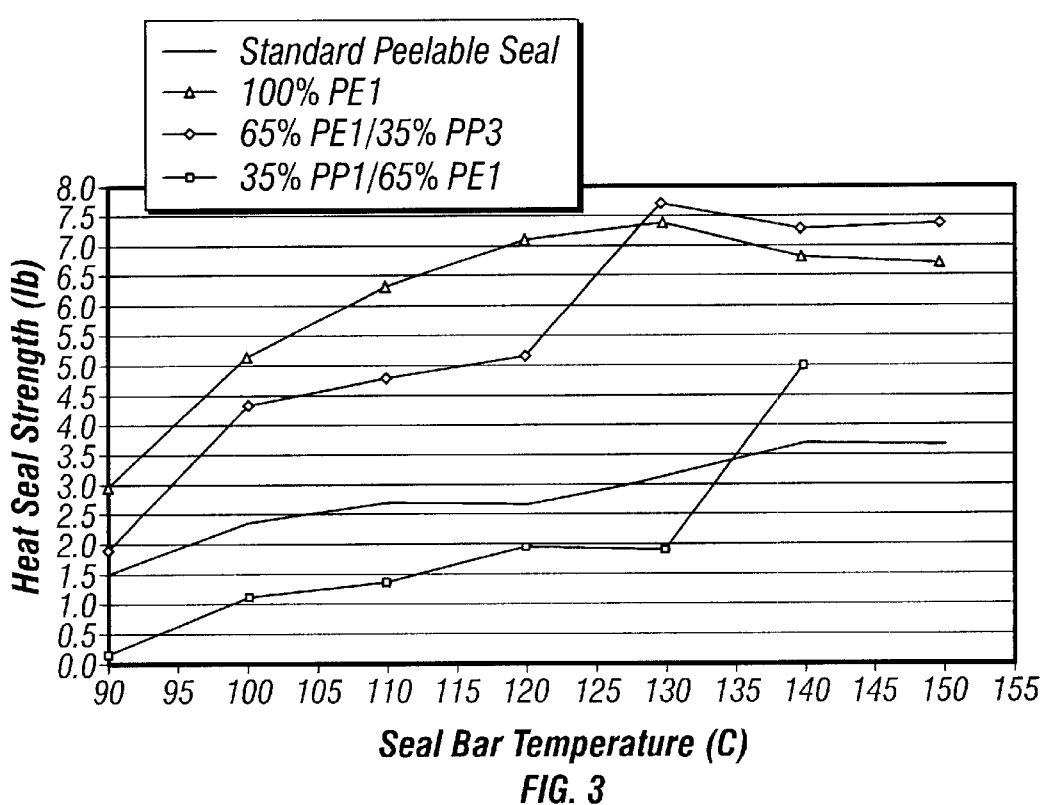
FIG. 3 compares the peelable seal performance for various polymers blends: the triangles represent a peelable seal made from 100% of the ethylene polymer of FIG. 1; the circles represent a peelable seal made from a blend of 65% of the ethylene polymer of FIG. 1 and 35% of the propylene polymer of FIG. 1; and the diamonds represent a peelable seal made from a blend of 65% of the ethylene polymer of FIG. 1 and 35% of the propylene polymer of FIG. 2.

The above heat seal strength data are plotted as a function of seal bar temperature in FIG. 3. The target heat seal strength was between 0.5 and 3 lb/in. Referring to FIG. 3, it can be seen that the peelable seal obtained from the blend of 65% PE1 resin and 35% PP1 resin had a relatively constant heat seal strength over a temperature window from about 100° C. to about 130° C. The solid line with symbols represents an imaginary standard peelable seal (the not represent the physical data from a real polymer blend).

EXAMPLE 4

In this example, the aging effect of a peelable seal obtained in Example 3 was studied. The peelable seal made from the blend comprising 65% PE1 resin and 35% PP1 resin was tested after four weeks. The heat seal strength data was compared with the data obtained from a peelable seal made from the same blend but tested after one day. The data are summarized in Table 9.

TABLE 9

Heat Seal Strength Data for One-Day Sample and Four-Week Sample

| 65% PE1/35% PP1 (One-Day) | | 65% PE1/35% PP1 (4-week) | |
| --- | --- | --- | --- |
| Temp (° C.) | Heat Seal Strength (lb/in) | Temp (° C.) | Heat Seal Strength (lb/in) |
| 90 | 0.160 | 90 | |
| 95 | | 95 | 0.540 |
| 100 | 1.106 | 100 | 0.774 |
| 105 | | 105 | 1.192 |
| 110 | 1.364 | 110 | 1.036 |
| 115 | | 115 | 1.376 |
| 120 | 1.934 | 120 | 1.668 |
| 125 | | 125 | 2.750 |
| 130 | 1.878 | 130 | 2.162 |
| 135 | | 135 | 4.978 |
| 140 | 4.968 | 140 | 6.240 |

Figure 4:
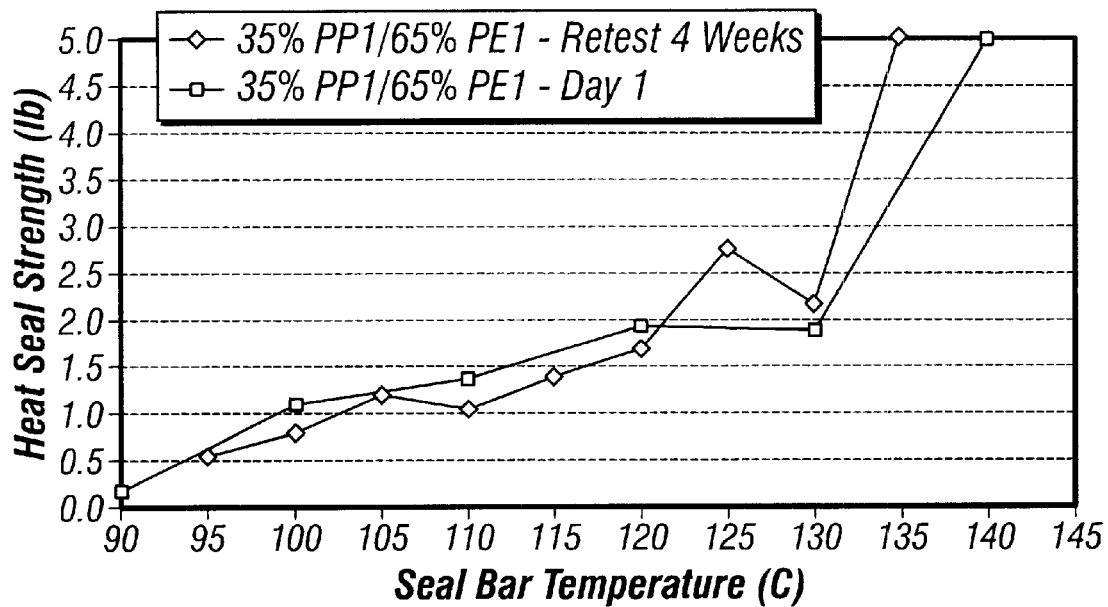
FIG. 4 shows the age-resistance of the peelable seal made in accordance with embodiments of the invention: the squares represent the peelable seal tested after one day; and the diamonds represent the peelable seal made from the same blend but tested after four weeks.

The data summarized in Table 7 are also plotted in FIG. 4. The data indicates that the heat seal strength does not substantially change over a four week period of time.

EXAMPLE 5

In this example, a number of sealed bags were produced on a standard vertical form/fill/seal packaging line. Three polymer blends were used to make the sealant layer of a peelable seal: 70% PE1/30% PP1; 64% PE1/36% PP1; and 61% PE1/39% PP1. After the sealed bags were made from each blend on a standard vertical form/fill/seal packaging line, the heat seal strength was measured as a function of heat sealing temperature. The data are summarized in Table 10.

TABLE 10

Heat Seal Strength Data for Form/Fill/Seal Bags

| 70% PE1/30% PP1 | | 64% PE1/36% PP1 | | 61% PE1/39% PP1 | |
| --- | --- | --- | --- | --- | --- |
| Temp (° C.) | Heat Seal Strength (lb/in) | Temp (° C.) | Heat Seal Strength (lb/in) | Temp (° C.) | Heat Seal Strength (lb/in) |
| 110 | 0.660 | 110 | 0.500 | 110 | 0.500 |
| 115 | 0.890 | 115 | 0.600 | 115 | 0.620 |
| 120 | 1.190 | 120 | 0.600 | 120 | 1.030 |
| 125 | 1.930 | 125 | 1.300 | 125 | 1.090 |
| 130 | 1.800 | 130 | 1.790 | 130 | 1.290 |
| 135 | 2.350 | 135 | 1.580 | 135 | 1.270 |
| 140 | 3.770 | 140 | 2.270 | 140 | 3.010 |

Figure 5:
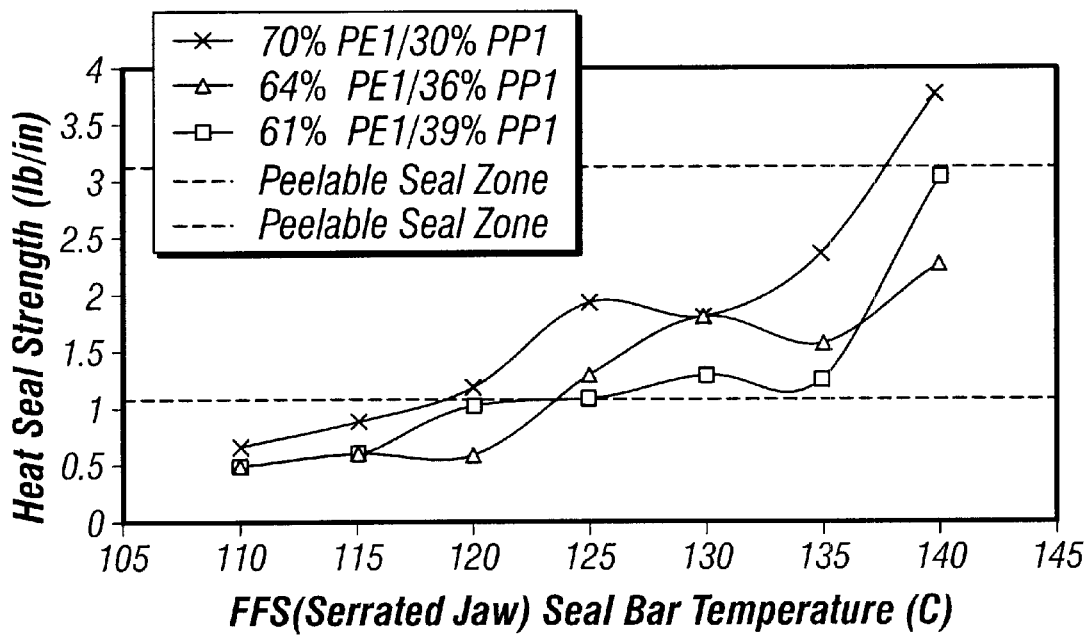
FIG. 5 is a plot showing the heat seal strength as a function of seal bar temperature for various peelable seals made according to embodiments of the invention.

The heat seal strength data as a function of seal bar temperature are plotted in FIG. 5. Referring to FIG. 5, it is seen that the heat seal strength substantially falls within the target range of 1–3 lb/in. Moreover, the peelable seal made from the blend of 61% ethylene copolymer and 39% polypropylene had a substantially constant heat seal strength over a temperature window from about 110° C. to about 135° C. It was observed that all of the peelable seals in this example gave a clean peel without excessive stringiness. (i.e., no substantial amount of angel hair).

As demonstrated above, embodiments of the invention provide a peelable seal and various polymers blends for making the peelable seal. The peelable seal made in accordance with embodiments of the invention may have one or more of the following advantages. First, the peelable seal has relatively consistent heat seal strength over a relatively wide window of temperature i.e., from about 100° C. to about 135° C. The peelable seal also produces a relatively clean peel, i.e., it does not generate excessive stringiness.

Although the performance of the peelable seal in accordance with embodiments of the invention is comparable to or better than peelable seals made from a blend of ethylene vinyl acetate and polybutylene, the costs are relatively lower. Therefore, a cost-effective alternative to existing peelable seals made from an EVA/polybutylene blend is provided. Moreover, the peelable seal made in accordance with embodiments of the invention is substantially free of odor, which makes it suitable for many consumer products applications. The peel strength of the peelable seal does not change substantially over time. Some peelable seals are relatively easy to open. Other advantages and properties are apparent to those skilled in the art.

While the invention has been described with respect to a limited number of embodiments, these embodiments are not intended to limit the scope of the invention as otherwise described and claimed herein. Variations and modifications therefrom exist. For example, the polymer blend for making the peelable seal in embodiments of the invention is not limited to two polymers. Three or more polymers may be used so long as one polymer forms a continuous phase and other polymers are dispersed in the continuous phase. As an example, a blend of polyethylene, polypropylene, and polybutylene can be used to make a peelable seal. In some embodiments, the peelable seals or compositions thereof may comprise additional compounds or components not described herein. In other embodiments, the peelable seals or compositions thereof do not include or are substantially free of any compound or component not enumerated herein. While the target heat seal strength falls between 0.5 and 3 lb/in. in various examples, the peelable seal is not so limited to such a range for heat seal strength. Instead, a peelable seal may have a heat seal strength between about 0.1 lb./in. to about 20 lb./in. The appended claims intend to cover all such variations and modifications as falling within the scope of the invention.

What is claimed is:

1. A peelable seal, comprising:
   a mixture of two immiscible polymers;
   a first polymer forming a continuous phase, the first polymer having a shear viscosity $\eta_1$ at a temperature of about 230° C. and a shear rate of about 100 radian/second; and
   a second polymer being dispersed in the continuous phase, the second polymer having a shear viscosity $\eta_2$ at a temperature of about 230° C. and a shear rate of about 100 radian/second,
   wherein the two polymers define a shear viscosity differential: $\Delta=|(\eta_1-\eta_2)/\eta_1|$, and the shear viscosity differential $\Delta$ is less than about 100%.

2. The peelable seal of claim 1, wherein the peelable seal is a monolayer.

3. The peelable seal of claim 1, wherein the peelable seal includes at least a base layer and a skin layer, and the skin layer is formed from the mixture of the two immiscible polymers.

4. The peelable seal of claim 1, wherein the peelable seal includes two base layers and a skin layer, and the skin layer is formed from the mixture of the two immiscible polymers.

5. The peelable seal of claim 1, wherein the shear viscosity differential $\Delta$ is less than about 50%.

6. The peelable seal of claim 1, wherein the shear viscosity differential $\Delta$ is less than about 30%.

7. The peelable seal of claim 1, wherein the shear viscosity differential $\Delta$ is less than about 20%.

8. The peelable seal of claim 1, wherein the shear viscosity differential $\Delta$ is less than about 10%.

9. The peelable seal of claim 1, wherein the shear viscosity differential $\Delta$ is less than about 5%.

10. The peelable seal of claim 1, wherein the shear viscosity differential $\Delta$ is zero or substantially close to zero.

11. The peelable seal of claim 1, wherein the first polymer is an ethylene polymer.

12. The peelable seal of claim 1, wherein the first polymer is a homogeneous substantially linear interpolymer.

13. The peelable seal of claim 11, wherein the ethylene polymer has a melt index in the range from about 0.1 to about 20 g/10 minutes.

14. The peelable seal of claim 11, wherein the ethylene polymer has a melt index in the range from about 0.6 to about 10 g/10 minutes.

15. The peelable seal of claim 11, wherein the ethylene polymer has a melt index in the range from about 1.5 to about 3 g/10 minutes.

16. The peelable seal of claim 1, wherein the second polymer is a propylene polymer.

17. The peelable seal of the claim 16, wherein the propylene polymer has a melt flow rate from about 0.01 to about 2 g/10 minutes.

18. The peelable seal of the claim 16, wherein the propylene polymer has a melt flow rate from about 0.1 to about 1 g/10 minutes.

19. The peelable seal of the claim 16, wherein the propylene polymer has a melt flow rate from about 0.3 to about 0.6 g/10 minutes.

20. The peelable seal of the claim 1, wherein the first polymer is an ethylene polymer with a melt index in the range from about 1.5 to about 3 g/10 minutes, and the second polymer is a propylene polymer with a melt flow rate from about 0.3 to about 0.6 g/10 minutes.

21. A peelable seal, comprising
    a mixture of an ethylene polymer having a melt index in the range from about 0.1 to about 20 g/10 minutes and a propylene polymer having a melt flow rate in the range from about 0.01 to about 2 g/10 minutes,
    wherein the ethylene polymer forms a continuous phase of the peelable seal, and the propylene polymer is dispersed in the continuous phase of the peelable seal.

22. The peelable seal of claim 21, wherein the peelable seal is a monolayer.

23. The peelable seal of claim 21, wherein the peelable seal includes at least a base layer and a skin layer, and the skin layer is formed from the mixture of the ethylene polymer and the propylene polymer.

24. The peelable seal of claim 21, wherein the peelable seal includes two base layers and a skin layer, and the skin layer is formed from the mixture of the ethylene polymer and the propylene polymer.

25. The peelable seal of claim 21, wherein the propylene polymer is uniformly dispersed in the continuous phase of the ethylene polymer.

26. The peelable seal of claim 21, wherein the ethylene polymer has a melt index in the range from about 0.6 to about 10 g/10 minutes.

27. The peelable seal of claim 21, wherein the ethylene polymer has a melt index in the range from about 1.5 to about 3 g/10 minutes.

28. The peelable seal of claim 21, wherein the ethylene polymer has a density from about 0.86 g/cc to about 0.97 g/cc.

29. The peelable seal of claim 21, wherein the ethylene polymer has a density from about 0.86 g/cc to about 0.92 g/cc.

30. The peelable seal of claim 21, wherein the ethylene polymer has a density from about 0.88 g/cc to about 0.92 g/cc.

31. The peelable seal of claim 21, wherein the ethylene polymer and the propylene polymer define a shear viscosity differential: $\Delta=|(\eta_e-\eta_p)/\eta_e|$, in which $\eta_e$ and $\eta_p$ are the respective shear viscosity of the ethylene polymer and the propylene polymer at a shear rate of about 100 radian/second and a temperature of about 230° C., and the shear viscosity differential $\Delta$ is less than 100%.

32. The peelable seal of claim 31, wherein the shear viscosity differential $\Delta$ is less than 50%.

33. The peelable seal of claim 31, wherein the shear viscosity differential $\Delta$ is less than 25%.

34. The peelable seal of claim 31, wherein the shear viscosity differential $\Delta$ is less than 10%.

35. The peelable seal of claim 31, wherein the shear viscosity differential $\Delta$ is less than 5%.

36. The peelable seal of claim 31, wherein the shear viscosity differential $\Delta$ is zero or substantially zero.

37. The peelable seal of claim 21, wherein the ethylene polymer is a homopolymer.

38. The peelable seal of claim 21, wherein the ethylene polymer is a copolymer or interpolymer.

39. The peelable seal of claim 21, wherein the ethylene polymer is selected from the group consisting of high density polyethylene, low density polyethylene, linear low density polyethylene, very low density polyethylene, and ultra low density polyethylene.

40. The peelable seal of claim 21, wherein the ethylene polymer is produced by a metallocene catalyst.

41. The peelable seal of claim 21, wherein the ethylene polymer is produced by a single site catalyst.

42. The peelable seal of claim 21, wherein the ethylene polymer is produced by a constrained geometry catalyst.

43. The peelable seal of claim 21, wherein the ethylene polymer is a homogeneous substantially linear ethylene polymer.

44. The peelable seal of claim 21, wherein the ethylene polymer has long chain branching.

45. The peelable seal of claim 21, wherein the propylene polymer is a homopolymer.

46. The peelable seal of claim 21, wherein the propylene polymer is a copolymer or interpolymer.

47. The peelable seal of claim 21, wherein the propylene polymer has a melt flow rate in the range from about 0.01 to about 2 g/10 minutes.

48. The peelable seal of claim 21, wherein the propylene polymer has a melt flow rate in the range from about 0.1 to about 1 g/10 minutes.

49. The peelable seal of claim 21, wherein the propylene polymer has a melt flow rate in the range from about 0.3 to about 0.5 g/10 minutes.

50. The peelable seal of claim 21, wherein the ethylene polymer has a melt index in the range from about 1.5 to about 3 g/10 minutes, and the propylene polymer has a melt flow rate of less than about 0.6 g/10 minutes.

51. A method of making a peelable seal, comprising:
    obtaining an ethylene polymer having a melt index in the range from about 0.1 to about 20 g/10 minutes;
    obtaining a propylene polymer having a melt flow rate in the range from about 0.01 to about 2 g/10 minutes;
    mixing the ethylene polymer and the propylene polymer to obtain a blend therefrom; and
    forming a peelable seal from the blend,
        wherein the ethylene polymer forms a continuous phase in the peelable seal, and the propylene polymer forms a dispersed phase in the peelable seal.

52. A method of making a peelable seal, comprising:
    obtaining a first polymer having a shear viscosity $\eta_1$ at a temperature of about 230° C. and a shear rate of about 100 radian/second;
    obtaining a second polymer having a shear viscosity $\eta_2$ at a temperature of about 230° C. and a shear rate of about 100 radian/second, the two polymers defining a shear viscosity differential $\Delta=|(\eta_1-\eta_2)/\eta_1|$ less than 100%;
    mixing the first polymer and the second polymer to form a blend; and
    forming a peelable seal from the blend,
        wherein the first polymer forms a continuous phase in the peelable seal, and the second polymer forms a dispersed phase in the peelable seal.

53. A polymer blend composition for a peelable seal, comprising:
    a blend of an ethylene polymer having a melt index in the range from about 0.1 to about 20 g/10 minutes and a propylene polymer having a melt flow rate in the range from about 0.01 to about 2 g/10 minutes,
    wherein the ethylene polymer is capable of forming a continuous phase of the peelable seal, and the propylene polymer is capable of being dispersed in the continuous phase of the peelable seal.

54. A polymer blend composition for a peelable seal, comprising:
    a blend of two immiscible polymers;
    a first polymer capable of forming a continuous phase, the first polymer having a shear viscosity $\eta_1$ at a temperature of about 230° C. and a shear rate of about 100 radian/second; and
    a second polymer capable of being dispersed in the continuous phase, the second polymer having a shear viscosity $\eta_2$ at a temperature of about 230° C. and a shear rate of about 100 radian/second,
        wherein the two polymers define a shear viscosity differential: $\Delta=|(\eta_1-\eta_2)/\eta_1|$, and the shear viscosity differential $\Delta$ is less than about 100%.

* * * * *